Aug. 30, 1932.   C. B. GRAY   1,874,036
METAL CUTTING TOOL
Filed Nov. 9, 1928
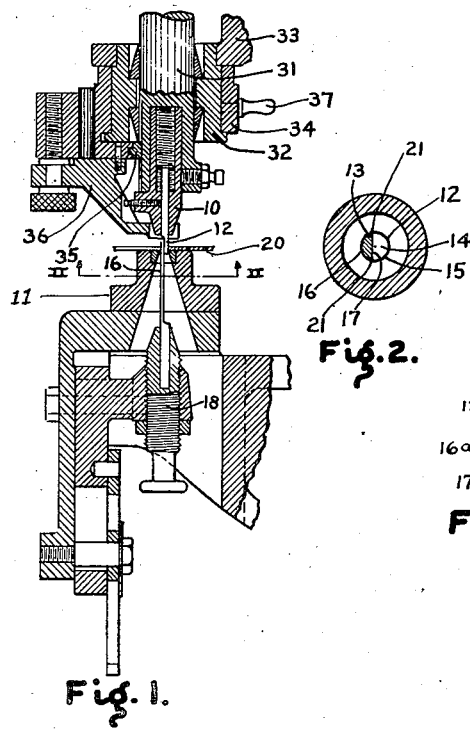
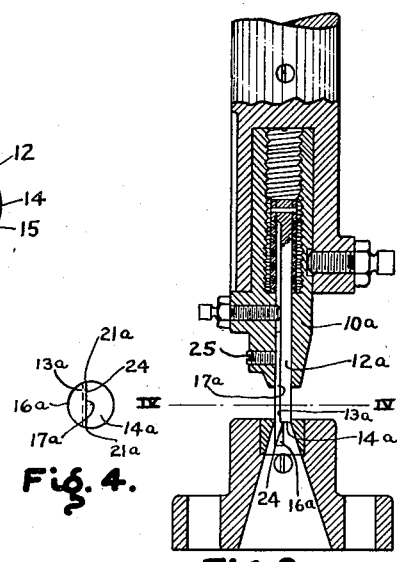
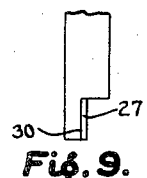
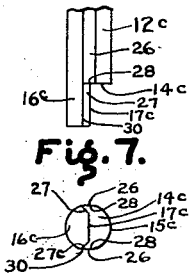
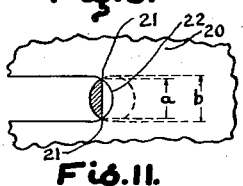
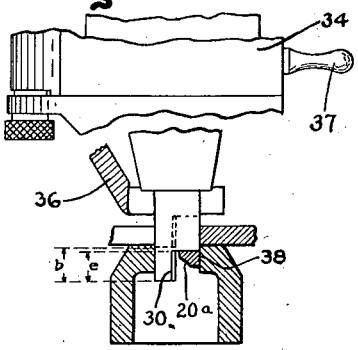
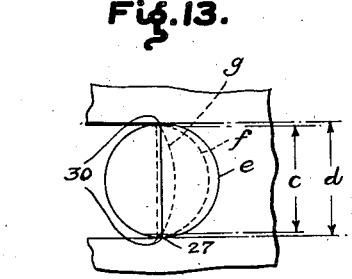
INVENTOR
Charles B Gray

Patented Aug. 30, 1932

1,874,036

UNITED STATES PATENT OFFICE

CHARLES B. GRAY, OF MILLBOURNE, PENNSYLVANIA

METAL CUTTING TOOL

Application filed November 9, 1928. Serial No. 318,283.

My invention relates to punches or tools for slotting or cutting machines of the punch type.

Machines are already in use for slotting or cutting sheet material, for example, sheet metal, such a machine including a reciprocatory punch and a cooperating die. Pilot means is provided to limit the extent of feed or material when the latter is cleared by the punch on its back stroke, the increment of feed being so chosen that slots having substantially straight sides may be cut. One type of tool for a machine of this character includes a central depending pilot stem portion. This particular type of tool requires a templet, it may not be readily redressed, and it may deflect in operation. With such a tool, there is no space for slug spreading, the pilot bottoming against the curved end of the slot being cut, and compression and spreading of a slug results in crowding of the latter against the pilot. The pressure developed on this account may result in deflection of the tool and possible consequent breakage of the latter or the die, particularly if the stock is restrained; and, if the stock is not restrained, the pressure due to crowding of a slug against the pilot causes the stock to move backwardly during the cutting stroke, with the result that the cut surface becomes more and more slanted after the first cutting stroke until there may be no cutting at all, the cutting edge sliding down the previously cut incline with dulling of the edge on that account. It is an object of my invention to provide a pilot which not only serves the function of limiting the increment of feed, but also one provided with space between the cutting edge and the pilot to accommodate spreading of slugs and prevent excessive crowding of the latter against the pilot, thereby avoiding deflection of the tool and consequent breakage if pushed into the die or pushing backward of the stock and consequent slanted cuts. As there is adequate space in front of the improved pilot at the end of a feed step to provide for slug spreading, excessive crowding against the pilot does rot occur and the undesired effects of crowding are avoided, the cuts being substantially straight or vertical as there is no substantial horizontal or lateral pressure due to crowding. Furthermore, the front pilot relief provides lateral guide edges, making a templet unnecessary when following a line.

My improved pilot has a cross section which is complementary to the punch face to provide an area corresponding approximately to that of the die; and, as the pilot extends beyond the punch face and preferably never leaves the die, or is at least in the latter when the punch face contacts with the material, it will be obvious that the pilot holds the punch against backward deflection during the punching or cutting operation. It is, therefore, a further object of my invention to provide a pilot having this capability.

As my improved punch has a front punch face with a pilot back of and extending longitudinally beyond the face, the punch may be readily dressed. It is, therefore, a further object of my invention to provide a punch having these features of construction to facilitate dressing.

A further object of my invention is to provide a punch tool having a front cutting edge and a back pilot, the section of the pilot being such that lateral guide edges for work are provided and excessive crowding of slugs against the pilot is avoided.

A further object of my invention is to provide apparatus of the character referred to wherein the pilot of the shearing tool is shorter than the ram stroke to facilitate ejection of chips or slugs, particularly when making curved or angular cuts.

A further object of my invention is to provide a combined punch and pilot having such relative dimensions transversely and from front to back, the pilot being suitably relieved at the back, that the tool may be readily turned in its own cut without side chafing, and the pilot fills the slot being cut to such an extent that, when the cutting edge is above the work, the lateral guide edges of the pilot hold the work or stock from getting under the cutting edge sidewise.

These and other objects are effected by my invention as will be apparent from the following description and accompanying drawing in which:

Fig. 1 shows a form of my improved punch and pilot and fragmentary portions of the machine;

Fig. 2 is a sectional view taken along the line II—II of Fig. 1;

Fig. 3 is a view similar to Fig. 1 but showing a modified construction of punch and pilot;

Fig. 4 is a plan view of the punch end of the apparatus shown in Fig. 3;

Figs. 5, 7 and 9 are similar to Fig. 3 but showing modified forms of punch and pilot;

Figs. 6, 8 and 10 are plan views, respectively, of Figs. 5, 7 and 9;

Figs. 11 and 12 are diagrammatic views exaggerated to indicate more clearly principles of the invention; and Fig. 13 is a view showing a principle of construction and operation preferably involved with all the forms of punches heretofore referred to.

Referring to the drawing, in Figs. 1 and 2, I show a reciprocatory ram having a tool holder 10 and an opposed and aligned die 11, the ram being reciprocated mechanically in any suitable manner. The modified forms of punches shown in the various views are intended to be carried by the ram. As will be pointed out, the punch has associated therewith a pilot for limiting the feed of material, for guiding the latter, and for reinforcing the punch during the cutting step. The punch is connected to the ram by means which provides for suitable longitudinal adjustment of the tool and which causes the tool to move with the ram and positively prevents relative angular movement between these parts.

In Figs. 1 and 2, I show a punch member 12 relieved at the back to provide a chordal back face 13 and having a lower segmental punch face 14 bounded by an arcuate cutting edge 15. A pilot 16 having a front chordal face 17 fitting the chordal face 13 in overlapping relation is arranged back of the punch face 14. In these views, the pilot 16 is supported separately from the punch, it being carried by a suitable holder 18 arranged below the die 11 and extending through and above the latter so as to overlap the punch 12 at all times. From Fig. 2, it will be seen that the cross sections of the overlapping punch and pilot portions are complementary to form a circular area. Assuming that the punch 12, on its back stroke, has cleared the material 20 being slotted, the pilot 16 being in the slot, then the material may be fed or advanced until the side edges 21 of the chordal or front face 17 of the pilot engage the circular sides of the slot to limit the feed of stock without the pilot bottoming in the preceding curved end of the slot so that adequate space is left for slug spreading and excessive crowding of slugs against the pilot is avoided.

It will be apparent that the distance between the pilot side edges must be slightly less than the punch diameter or slot width, otherwise feed would not be possible. On the other hand, the difference should not be so great as to result in rough or scalloped slot sides. Diagrammatic Fig. 11 has been exaggerated to show the front face pilot edges 21 spaced apart a distance $a$ less than the punch diameter or slot width $b$. The forward convex end of the slot is shown at 22. Therefore, after a punching stroke and when the punch face clears the material 20, the latter may be fed or advanced, the extent being dependent upon the difference between $b$ and $a$, until the side edges 21 engage the concave slot end 22.

As the chordal distance apart of the guide edges is nearly equal to a tool diameter and as the pilot front face is spaced from the center of the cutting edge at least a tool radius, and preferably more than a radius, as is the case where the pilot front face is entirely flat, a substantially segmental clearance space between the pilot front face and the curved slot end results at the end of a feed step, this making possible a width of clearance space along the diameter bisecting the cutting edge which is relatively large compared to the width of the crescent overlap or bite of the tool.

As the width of the pilot face 17 is nearly equal to the diameter of the punch, or to the slot width, and as the edges 21 engage at spaced points on the concave slot end, it will be apparent that a given line or outline may be followed without a templet. The side edges 21 in engaging the side portions of the curved slot end 22 exert a centering effect and prevent side play of the blank.

Upon reference to Fig. 1, it will be seen that, during the entire period of punching or cutting, the punch is supported against backward deflection by the pilot, the latter, in turn, being supported against backward deflection by the die; however, this support would be inadequate to withstand lateral pressure on account of slug spreading but for the space left to take care of the latter.

As the punch in Figs. 1 and 2 has a very simple shape, it may be readily dressed, it being merely necessary to grind the punch face.

In Figs. 3 and 4, I show a modified form of punch member 12a having a chordal back face 13a against which fits, in overlapping relation, the chordal face 17a of the pilot 16a, the latter having a portion 24 which underlaps the punch face 14a. The underlapping portion has guide edges 21a serving the purpose just described for the edges 21 in Figs. 1 and 2. The pilot 16a is formed separately from the punch 12a; however, these parts are effective as a unit, both being carried by a holder 10a and the latter being preferably provided with any suitable means as a screw 25, for connecting the punch and pilot members together.

Figs. 5 and 6 show a further modified form where the pilot 16b is formed as an integral part of the punch member 12b, such pilot extending below or beyond the punch face 14b. This form of tool also has such a cross-section that it will turn in its slot or cut; and the pilot has such a cross-sectional shape that proper feed is effected, the stock being guided by the pilot lateral guide edges and the front face of the pilot being spaced backwardly from the cut end of a slot at the end of a feed step to take care of slug spreading without excessive crowding of slugs against the pilot.

In Figs. 7 and 8, I show a modified form of the construction shown in Figs. 5 and 6. In these views, the punch 12c is provided with diametrically opposed flats 26 and the pilot 16c has a front face 17c having side beveled portions 27 extending to the periphery of the punch body so that the flats 26, or at least portions thereof, provide parallel portions 28 of the cutting edge 15c bounding the punch face 14c. The parallel cutting edge portions 28 assure the cutting of a slot with straight or smooth sides, and the relief provided by the bevels 27 makes it possible to extend the pilot substantially forward while preserving a desired increment of feed and space for spreading of slugs. In this way, a very strong pilot may be provided. Also, in operation, the punch of this general character tends to crowd metal back at the sides; and, with this particular form, such crowding may take place back into the relieved spaces provided by the bevels 27 and is advantageously cut away at the sides by the punch cutting edge. In other words, by providing space for the crowded metal to flow into at the sides, better operation and cutting at the sides and in front of the pilot, can be secured and less pressure is exerted tending to deflect or deform the punch backwardly.

In Figs. 9 and 10, I show a further form of my invention which is like Figs. 7 and 8 except that flats 26 are not provided.

Diagrammatic Fig. 12 shows how the provision of side bevels 27 makes possible a stronger pilot for the latter may extend forwardly to any extent so long as it does not contact with the concave end of the slot and allows space for slug spreading. In Figs. 7, 8, 9, 10, 12 and 13, the bevels intersect or meet the peripheral surface of the punch body to provide lateral guide edges 30, these edges beng separated by a chordal distance slightly less than the diameter of the punch body. In Fig. 12, the chordal distance is indicated at c and the diameter at d; and, as heretofore explained in connection with Fig. 11, the blank may be fed forward for each stroke a distance dependent upon the difference between d and c.

In Figs. 1 and 13, I show the punch holders 10 carried by rams 31 fitting guides 32 on the machine frame 33; and the external cylindrical surface of the guide 32 provides a bearing for the turret sleeve 34, the latter having a key or spline 35 fitting the slot 36 in the ram. The turret sleeve 34 is also preferably provided with a stripper 36 so that the correct relation of the tool and stripper in operation is maintained. The turret sleeve may be turned by a handle 37. From Fig. 1, it will be seen that the tool or punch is capable of longitudinal adjustment relative to the holder and that the latter is held against relative angular movement with respect to the ram by any suitable means, for example, the screw 38. Since the dies have circular openings and the tool bodies, or the bodies of the punch and the pilot taken together, are cylindrical, it will be apparent that change in direction of cutting may be effected by turning the tool relatively to the blank.

Briefly, my improved punch operates as follows: On the punching stroke, the cutting edge cuts out material as determined by the increment of feed; and, as soon as the punch leaves the material, the latter is fed forward until limited by the pilot, whereupon a succeeding cut takes place and so on. My improved pilot makes possible the following: (1) It provides spaced and centering guide edges making a templet unnecessary; (2) As it is always in the stock and in the die before the punch face reaches the material, it serves to reinforce the punch against backward deflection; and (3) Its relative arrangement with respect to the punch face, that is, back of the punch face, sufficiently to maintain clearance between the front face of the pilot and slugs or chips when the latter spread due to cutting pressure and permits of ready dressing of the punch.

Figs. 12 and 13 show diagrammatically the spread of a slug during cutting. In Fig. 13, the slug 38 is thinner than the stock and the top surface is wider than the bottom surface on account of spreading, the bottom surface being the extent of feed. Therefore, if the upper portion of the slug is not to crowd against the front face of the pilot the latter must be spaced rearwardly relatively to the cutting edge to provide proper clearance. In the drawing, the pilot front face is spaced from the center of the cutting edge a distance approximately equal to the radius of the body. In Fig. 12, the line —e— indicates the cutting edges, —f— the preceding cut edge or bottom rear edge of the slug, and —g— the top rear edge of the slug. The crescent space between —e— and —f— shows the extent of feed and, therefore, of the slug bottom surface. The space between —g— and —e— represents the top surface of the slug; and this space is much wider than that between —e— and —f—, from which it will be apparent the pilot front face must be set back far enough to allow for spreading.

Diagrammatic Fig. 12 shows the tool cutting face between the cutting edge —e— and the pilot front face. After a cutting stroke and assuming that the curved slot end is at the position of the cutting edge —e—, stock may be advanced until the curved slot end reaches the position of curve —f— so that the segmental clearance space between the curve —f— and the pilot front face along a diameter bisecting the cutting edge is relatively wide compared to the width along the same diameter of the crescent between —e— and —f—. The segmental shape of the clearance space results from the features of spacing the guide edges nearly a diameter apart and of backward spacing of the pilot front face; and the segmental space provides, for a given area, relatively great width along a bisecting diameter, where width is most required, for the maximum width of slug, and therefore maximum slug spreading, is at this diameter. On account of the practical consideration of grinding, I preferably have the pilot front face flat. Round tool stock is ground back to the axis or slightly therebeyond: and, if ground back to the axis, the sides of the pilot are bevelled to obtain the desired guide edge spacing; or, if it is desired to provide the guide edges coincident with grinding the pilot front face, then grinding is carried on a desired fraction of a radius back of the axis. This procedure made possible by characteristics of the tool is not only advantageous in being simple and being productive of accurate tool manufacture, but the user may, without difficulty, follow the same procedure in redressing the tool. Therefore, my improved tool has the characteristic feature that the pilot front face defines with an arc of tool radius, less than 180 degrees and terminating at the guide edges, a substantially segmental space (the clearance space for slug spreading), this space, for the same area, being relatively wide along the diameter bisecting the cutting edge; and I prefer to have the width of the segmental space as large as practicable compared to the width of the crescent area in front thereof. Maximum width may be secured with a pilot front face entirely flat, in which case the width may not only be greater than but several times as great as the crescent width. Hence, as the shape of the clearance space is segmental, this being due to structural characteristics of the tool, maximum clearance width for a tool of practical construction is provided where width is most required.

From the foregoing, it will be apparent that I have provided a punch having a pilot so arranged that it cooperates with the sides of a slot being cut in stock in following a line without a templet, or a templet may be used if desired. The lateral guide edges of the pilot are spaced apart a distance approximating the width of slot being cut, that is, such distance is just sufficiently less than the slot width or tool diameter as to provide for a desired increment of feed; and, in operation, the guide edges prevent sidewise movement of stock and assure forward centered movement thereof as such guide edges engage the curved cut end of a slot at points near to the slot sides. The front face of the pilot is spaced backwardly from the cutting edge so that when the guide edges engage the curved cut slot end at the end of a feed step adequate space is left between the slot end and the pilot front face to provide for slug spreading without excessive crowding of slugs against the pilot, thereby avoiding deflection of the tool or backward movement of the stock on account of pressure due to excessive crowding. Furthermore, the punch and its pilot are turnable in the slot being cut.

There are several features disclosed herein which are identical with features disclosed in my application, Serial No. 248,449, filed January 21, 1928. The present application is, therefore, a continuation in part of subject-matter divided from that application.

While I show pilots having substantially flat front faces, this is not essential. The faces may have any suitable shape so long as the pilot is substantially back of the punch face and the aforementioned advantages may be realized.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The combination with a nibbling machine provided with a reciprocatory ram and a die having a cylindrical opening, of a tool construction carried by the ram and cooperating with the die, the tool construction having a front circular cutting edge and a back pilot provided with a back face which is a cylindrical element coaxial with and of the same radius of curvature as the cutting edge and fitting the die opening to prevent backward deflection of the tool construction during cutting strokes and provided with a front face spaced from the center of the cutting edge at least a tool construction radius and intersecting the back face to define lateral guide edges disposed backwardly of the tool construction axis sufficiently to secure chordal spacing apart of the guide edges nearly a tool construction diameter and the pilot front face defining, with an arc of tool construction radius, less than 180 degrees and terminating at the guide edges, an area which is substantially segmental so that the central width thereof along the diameter bisecting the cutting edge may be relatively large compared to the width along the same diameter of the crescent area between the arc and the cutting edge.

2. The combination as claimed in claim 1 wherein the entire pilot front face is flat.

3. The combination as claimed in claim 1 wherein the tool construction is provided with side flats defined by parallel planes containing the guide edges.

In testimony whereof I affix my signature.

CHARLES B. GRAY.